US011341792B2

(12) United States Patent
Ashok et al.

(10) Patent No.: US 11,341,792 B2
(45) Date of Patent: *May 24, 2022

(54) ACCESS CONTROL AND LOCATION TRACKING SYSTEM

(71) Applicant: E-SMART SYSTEMS PVT. LTD., New Dehli (IN)

(72) Inventors: Anurag Ashok, New Dehli (IN); Ashok Kumar Joshi, Dehradun (IN)

(73) Assignee: E-SMART SYSTEMS PVT. LTD., New Delhi (IN)

( * ) Notice: Subject to any disclaimer, the term of this patent is extended or adjusted under 35 U.S.C. 154(b) by 0 days.

This patent is subject to a terminal disclaimer.

(21) Appl. No.: 16/920,778

(22) Filed: Jul. 6, 2020

(65) Prior Publication Data

US 2020/0334931 A1    Oct. 22, 2020

Related U.S. Application Data

(63) Continuation-in-part of application No. 16/095,561, filed as application No. PCT/IN2017/000073 on Apr. 7, 2017, now Pat. No. 10,740,995.

(30) Foreign Application Priority Data

Apr. 22, 2016   (IN) .............................. 201611014184

(51) Int. Cl.
*G07C 9/00*    (2020.01)
*H04W 4/02*    (2018.01)
*H04W 4/80*    (2018.01)
*H04W 12/63*   (2021.01)
*H04W 12/069*  (2021.01)

(52) U.S. Cl.
CPC .......... *G07C 9/00182* (2013.01); *H04W 4/02* (2013.01); *H04W 4/80* (2018.02); *H04W 12/069* (2021.01); *H04W 12/63* (2021.01); *G07C 2009/00261* (2013.01)

(58) Field of Classification Search
None
See application file for complete search history.

(56) References Cited

U.S. PATENT DOCUMENTS 10,740,995 B2 *   8/2020   Ashok ..................... G07C 9/28

* cited by examiner

*Primary Examiner* — Daniell L Negron
(74) *Attorney, Agent, or Firm* — Chip Law Group

(57) ABSTRACT

A system for providing controlled access and tracking location of an individual within a restricted area includes access cards, access control devices, location tracking devices, a gateway device, and a server. The access card includes identification data which facilitates the access control devices to provide physical access to the individual into the restricted area. The access cards also transmit beacon signals to facilitate the access control devices and the location tracking devices to track location of the individual within the restricted area. The gateway device is connected to the access control devices and the location tracking devices. The server is connected to the gateway device.

20 Claims, 7 Drawing Sheets

ACCESS CONTROL AND LOCATION TRACKING SYSTEM

CROSS-RELATED APPLICATIONS

This application is a continuation-in-part of U.S. patent application Ser. No. 16/095,561, filed Oct. 22, 2018, which claims priority of PCT No. PCT/IN2017/000073, filed Apr. 7, 2017, which claims priority of Indian patent application No. 201611014184, filed Apr. 22, 2016, the contents of which are incorporated herein by reference.

FIELD

The present disclosure relates to access control systems. More particularly, the present disclosure relates to a system that provides physical access control and location tracking within a restricted area.

BACKGROUND

Smart devices, hereinafter referred to as devices, have become increasingly popular in today's fast-paced world. Examples of such devices are mobile phones, tablets, automobiles, temperature regulators, electric lamps, televisions, burglar alarms, and the like. The devices typically include sensors, actuators, transducers, cameras, accelerator elements, and the like that detect changes in the surroundings in which the devices are deployed. The devices are also capable of communicating among themselves by way of one or more communication protocols such as near-field communication (NFC), Bluetooth, wireless fidelity (Wi-Fi), and the like. Further, the devices dynamically alter their corresponding outputs based on the changes occurring in the surroundings in which they are deployed. Typically, multiple devices are implemented in an area to perform predefined tasks. The predefined tasks include temperature regulation of an air conditioner, brightness control of indoor and outdoor lighting, security systems, physical access control, location tracking, and the like. Internet of things (IoT) provides one such environment in which the devices connect and interact with each other to perform the predefined tasks effectively. The IoT provides better interoperability as compared to the traditional communication protocols to perform the predefined tasks.

One such application of the IoT is physical access control. A known technique for providing physical access of a restricted area to an individual is to use an access control system. The access control system includes multiple access cards and multiple access card readers. The restricted area may be a house, commercial buildings, hospitals, research centers, airports, high security zones, and the like. The access control system provides access of the restricted area to the individual by deploying the access card readers near doors, gates, elevators, and the like. An access card includes a credential corresponding to the individual. The access card reader receives the credential of the individual when the access card is scanned with or inserted in the access card reader. When the access card is scanned with or inserted in the access card reader, the access control system allows or restricts the access of the restricted area to the individual based on the credential stored in the access card.

In the restricted areas, such as the commercial buildings, the hospitals, the high security areas, and the like, it is essential to know the accurate location of the individual. Information corresponding to the location of the individual is essential in management of business operations in the commercial buildings, efficient provision of healthcare in hospitals, and effectively securing the high security areas. Further, location tracking of assets, such as inventories, machines, industrial equipment, and the like, is important in the restricted areas to avoid security breaches and loss of the assets. However, the access control systems existing in the prior art do not track the location of the individual when the individual enters the restricted area. Further, the access control systems existing in the prior art do not provide access and track location of the individuals, inventories, and machines, simultaneously. Moreover, the access card readers and the location tracking systems existing in the art can support only a limited number of devices.

In light of the foregoing discussion, there exists a need for an access control and location tracking system which provides physical access to one or more individuals and simultaneously tracks a location of each of the one or more individuals, physical objects, and machines in the restricted area efficiently.

SUMMARY

An object of the present disclosure is to provide an access control and location tracking system that provides physical access of a restricted area to an individual.

Another object of the present disclosure is to provide an access control and location tracking system that generates a visual model that includes location information of the individual and one or more assets within the restricted area.

In one embodiment of the present disclosure, the access control and location tracking system includes a server, a gateway device, an access card, an access control device, a location tracking device, and a locking mechanism. The server stores verification data that includes a plurality of credentials and a plurality of identification (ID) numbers (or a plurality of certificates) corresponding to a plurality of individuals. The gateway device is communicatively coupled to the server for receiving the verification data from the server. In an exemplary embodiment, the gateway device may be a standalone device or may be integrated or built into the access control device. The access card stores a credential and an ID number (or a secure stored data such as a certificate) of the individual. The access card transmits a near field communication (NFC) signal and a Bluetooth or Ultra-wideband (UWB) signal. The NFC signal includes the credential of the individual and the Bluetooth or UWB signal includes the ID number (or the certificate) of the individual. The access control device and the location tracking device receive the verification data from the gateway device. The access control device receives the NFC and the Bluetooth or UWB signals from the access card. The access control device compares the credential and the ID number (or the certificate) of the individual with the verification data and generates an access control signal. The locking mechanism, connected (i.e., communicatively coupled) to the access control device, receives the access control signal, and provides access of the restricted area to the individual. The access control device determines a first location of the individual based on the Bluetooth or UWB signal and generates first location data. The access control device transmits the first location data to the gateway device. The location tracking device receives the ID number (or the certificate) of the individual from the access card. The location tracking device compares the ID number (or the certificate) of the individual with the verification data. The location tracking device determines a second location of the individual based on the Bluetooth or UWB signal and generates second location data. The location tracking device transmits the second location data to the gateway device.

In another embodiment of the present disclosure, a method for providing physical access of the restricted area to the individual is provided. The method tracks the plurality of locations of the individual. A server stores verification data that includes a plurality of credentials and identification (ID) numbers (or certificates) corresponding to a plurality of individuals. A gateway device receives the verification data from the server. The gateway device transmits the verification data to an access control device and a location tracking device. An access card transmits an NFC signal and a Bluetooth or UWB signal that include a credential and an ID number (or a secure stored data such as a certificate) of the individual, respectively. The access card receives the credential and the ID number (or the certificate) of the individual. The access card compares the credential and the ID number (or the certificate) of the individual with the verification data and generates an access control signal. A locking mechanism, connected to the access control device, receives the access control signal, and provides access of the restricted area to the individual. Further, the access control device determines a first location of the individual based on the Bluetooth or UWB signal and generates first location data. The access control device transmits the first location data to the gateway device. The location tracking device receives the ID number (or the certificate) of the individual from the access card. The location tracking device compares the ID number (or the certificate) of the individual with the verification data. The location tracking device determines a second location of the individual based on the Bluetooth or UWB signal and generates second location data. The location tracking device transmits the second location data to the gateway device.

Thus, the system provides access of the restricted area to the individual and tracks multiple locations of the individual, simultaneously. Further, the server receives the first and second location data corresponding to the first and second location of the individual, respectively, from the gateway device and generates a visual model based on at least one of the first and second location data. The visual model displays the locations of the individual including at least one of the first and second locations in the restricted area.

BRIEF DESCRIPTION OF THE DRAWINGS

The following detailed description of the preferred embodiments of the present disclosure will be better understood when read in conjunction with the appended drawings. The present disclosure is illustrated by way of example, and not limited by the accompanying figures, in which like references indicate similar elements.

DETAILED DESCRIPTION OF EMBODIMENTS

As used in the specification and claims, the singular forms "a", "an", and "the" include plural references unless the context clearly dictates otherwise. For example, the term "an article" may include a plurality of articles unless the context clearly dictates otherwise.

Those with ordinary skill in the art will appreciate that the elements in the figures are illustrated for simplicity and clarity and are not necessarily drawn to scale. For example, the dimensions of some of the elements in the figures may be exaggerated, relative to other elements, in order to improve the understanding of the present disclosure.

There may be additional components described in the foregoing application that are not depicted on one of the described drawings. In the event such a component is described, but not depicted in a drawing, the absence of such a drawing should not be considered as an omission of such design from the specification.

Before describing the present disclosure in detail, it should be observed that the present disclosure utilizes a combination of components which constitutes a secure environment and is used to provide access of a restricted area to an individual and to track location of the individual in the restricted area. Accordingly, the components and the method steps have been represented, showing only specific details that are pertinent for an understanding of the present disclosure so as not to obscure the disclosure with details that will be readily apparent to those with ordinary skill in the art having the benefit of the description herein.

As required, detailed embodiments of the present disclosure are disclosed herein. However, it is to be understood that the disclosed embodiments are merely exemplary of the disclosure, which can be embodied in various forms. Therefore, specific structural and functional details disclosed herein are not to be interpreted as limiting, but merely as a basis for the claims and as a representative basis for teaching one skilled in the art to variously employ the present disclosure in virtually any appropriately detailed structure. Further, the terms and phrases used herein are not intended to be limiting but rather to provide an understandable description of the disclosure.

Figure 1:
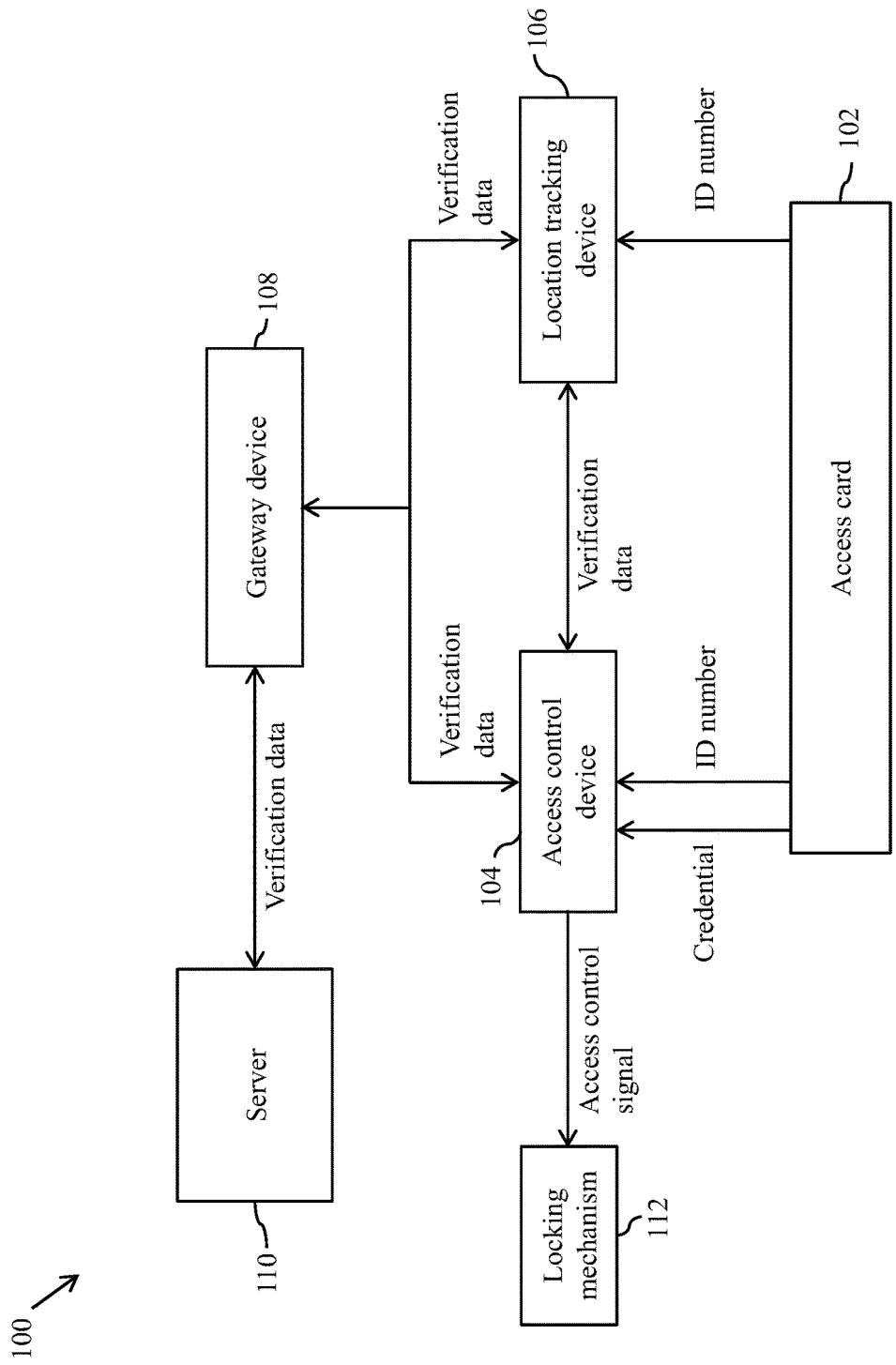
FIG. 1 illustrates a schematic block diagram of an access control and location tracking system, in accordance with an exemplary embodiment of the present disclosure.

Referring now to FIG. 1, a schematic block diagram of an access control and location tracking system 100 (hereinafter referred to as 'the system 100') in accordance with an exemplary embodiment of the present disclosure is shown. The system 100 provides access of a restricted area to an individual. Further, the system 100 tracks multiple locations of the individual in the restricted area in real-time. The system 100 also tracks one or more locations of one or more physical objects such as vehicles, packed goods, phones, laptops, and the like. The system 100 finds applications in commercial buildings, hospitals, airports, private homes, schools, and the like. The system 100 also tracks the location of the vehicles that are parked outside the restricted area within an outdoor coverage distance. The system 100 includes a plurality of access cards 102 (one of which is shown), a plurality of access control devices 104 (one of which is shown), a plurality of location tracking devices 106 (one of which is shown), a plurality of gateway devices 108 (one of which is shown), a server 110, and a plurality of locking mechanisms 112 (one of which is shown).

In a preferred embodiment of the present disclosure, the system 100 provides physical access of the restricted area to the individual and tracks multiple locations of the individual based on a credential and an identification (ID) number (or secure stored data such as a certificate) of the individual. The server 110 stores verification data that includes at least one of multiple credentials, multiple ID numbers, or multiple certificates corresponding to multiple individuals. The server 110 transmits the verification data to the gateway device 108. The gateway device 108 transmits the verification data to both the access control device 104 and the location tracking device 106. The access control device 104 is configured to provide physical access of the restricted area to the individual based on the credential of the individual. The access control device 104 further controls the locking mechanism 112, which is attached to an access door (not shown) of the restricted area. The locking mechanism 112 is configured to lock and unlock the access door of the restricted area, thereby allowing and restricting the access of the restricted area to the individual, respectively. The access control device 104 and the location tracking device 106 track the multiple locations of the individual within the restricted area.

The server 110 stores the verification data that includes one or more sets of credentials, identification (ID) numbers, and certificates corresponding to the plurality of individuals. The sets of credentials, ID numbers, and certificates belong to the individuals having access privilege of the restricted area. The server 110 includes an input interface (not shown) that receives a new credential and a new ID number (or a new secure stored data such as a new certificate) corresponding to a new individual. The server 110 includes a database (not shown) that stores verified credentials and verified ID numbers (or verified certificates) of individuals authorized to enter the restricted area. When the server 110 receives the new credential and new ID number or certificate, it compares the new credential and the new ID number or certificate with the verified credentials and the verified ID numbers or certificates, respectively. The server 110 further updates the verification data with the new credential and the new ID number or certificate based on the comparison of the new credential and the new ID number or certificate with the verified credentials and the verified ID numbers or certificates, respectively. The updated verification data enables access privilege of the restricted area to the new individual. Various examples of the credential of the individual include social security numbers, biometric information, personal ID numbers, and the like, that identify the individual. The ID number of the individual may be a unique ID code generated based on the credential of the individual. The server 110 further includes a map of the restricted area and a software code. The software code is configured to generate a three-dimensional (3D) representation of the restricted area based on the map of the restricted area.

Figure 2:
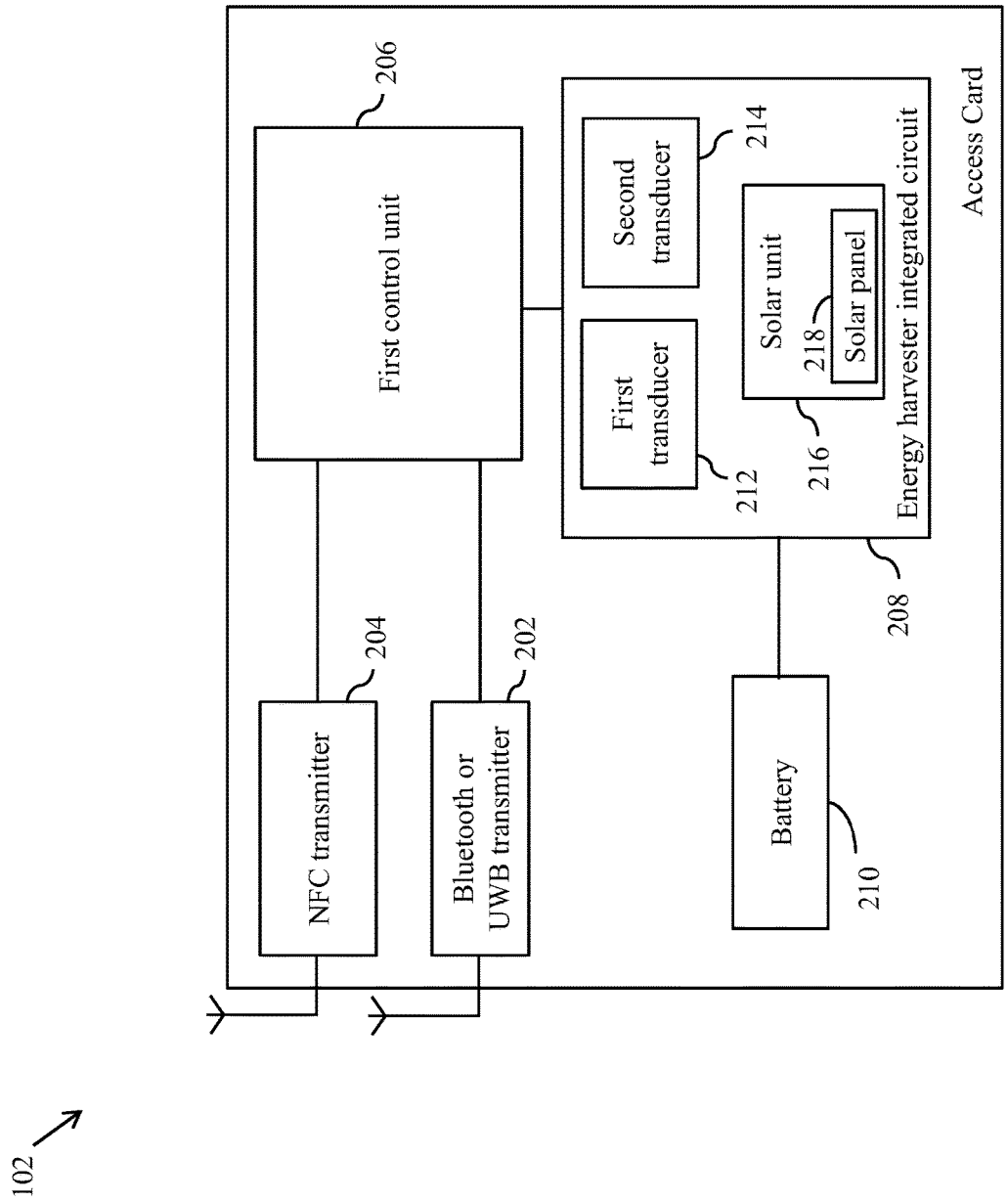
FIG. 2 illustrates a schematic block diagram of an access card used in the access control and location tracking system of FIG. 1, in accordance with an exemplary embodiment of the present disclosure.

Referring now to FIG. 2, a schematic block diagram of the access card 102 used in the system 100 in accordance with an exemplary embodiment of the present disclosure is shown. The access card 102 is assigned to the individual and stores the credential and the ID number or certificate corresponding to the individual. Thus, each individual of the plurality of individuals carries a corresponding access card 102. The access card 102 includes a Bluetooth or Ultra-wideband (UWB) transmitter 202, a near-field communication (NFC) transmitter 204, a first control unit 206, an energy harvester integrated circuit 208, and a battery 210. The access card 102 supports NFC and Bluetooth or UWB communication protocols. It will be understood by those skilled in the art that the communication protocols supported by the access card 102 may include ZigBee, wireless fidelity (Wi-Fi), radio-frequency identification (RFID), Satellite, Ethernet transceiver, and the like. In the preferred embodiment, the NFC transmitter 204 communicates with the access control device 104. The Bluetooth or UWB transmitter 202 communicates with the access control device 104 and the location tracking device 106. The NFC and the Bluetooth or UWB transmitters 204 and 202 transmit the credential and the ID number or the certificate of the individual by way of NFC and Bluetooth or UWB signals, respectively. In an exemplary embodiment, the Bluetooth signal is a Bluetooth low energy (BLE) beacon signal. In an exemplary embodiment, the UWB signal is a signal with a bandwidth higher than 20% of its center frequency, or a signal with a bandwidth higher than 0.5 GHz. The American Federal Communications Commission (FCC) specified a band of operation for UWB signals from 3.1 to 10.6 GHz in 2002. The NFC transmitter 204 transmits the NFC signal to the access control device 104 when the access card 102 is in proximity of the access control device 104. The Bluetooth or UWB transmitter 202 periodically broadcasts the Bluetooth or UWB signal to the access control device 104 and the location tracking device 106 based on a first clock signal. The first control unit 206 sets the first clock signal to ensure periodic broadcast of the Bluetooth or UWB signal. The first control unit 206 is configured to control operations of the NFC and Bluetooth or UWB transmitters 204 and 202. In another embodiment, the Bluetooth or UWB transmitter 202 broadcasts the Bluetooth or UWB signal continuously.

The energy harvester integrated circuit 208 converts energy from one or more external sources such as radio frequency (RF) waves, kinetic energy from physical movements of the individual, and solar energy into a voltage signal. The energy harvester integrated circuit 208 includes a first transducer 212, a second transducer 214, and a solar unit 216. The first transducer 212 receives the RF waves from mobile base stations, mobile handsets, Wi-Fi routers, and the like, and generates the voltage signal by converting the electromagnetic energy of the RF waves into a first voltage signal. The first transducer 212 includes a radio receiver to convert the electromagnetic energy into the first voltage signal. Similarly, the second transducer 214 converts the kinetic energy from the physical movements of the individual and the access card 102 into a second voltage signal. The second transducer 214 may include a Geophone to convert the kinetic energy into the second voltage signal. Further, the solar unit 216 receives the solar energy by way of a solar panel 218 and converts the solar energy into a third voltage signal. The first, second, and third voltage signals (collectively referred to as "a supply voltage signal") generated by the first transducer 212, the second transducer 214, and the solar unit 216, respectively, are used to charge the battery 210. The battery 210 provides the supply voltage signal to the Bluetooth or UWB transmitter 202, the NFC transmitter 204, the first control unit 206, and the energy harvester integrated circuit 208. In an exemplary embodiment, the access card 102 has a clamshell design with dimensions of 1.9 mm×54 mm×85.6 mm.

Figure 3:
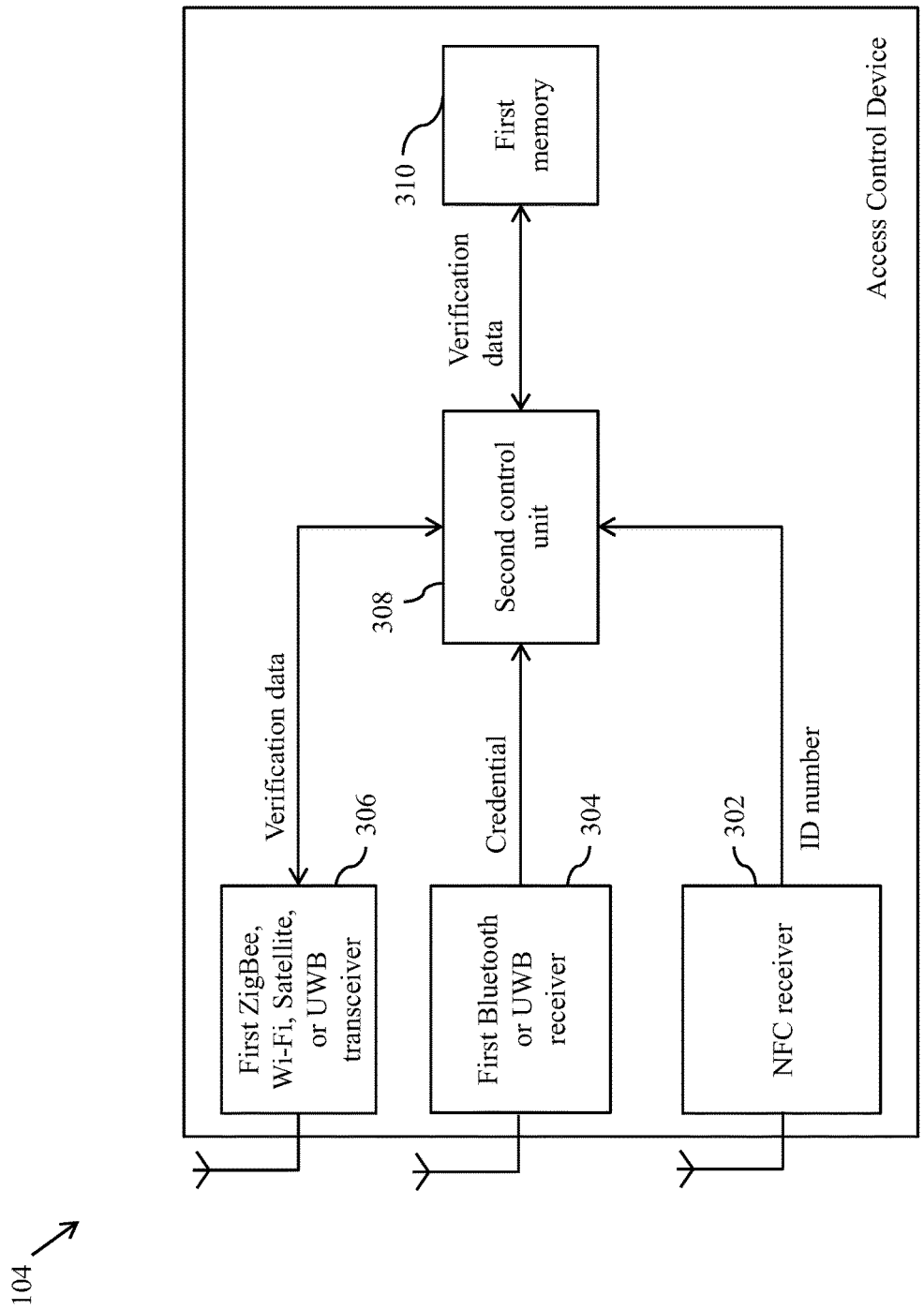
FIG. 3 illustrates a schematic block diagram of an access control device used in the access control and location tracking system of FIG. 1, in accordance with an exemplary embodiment of the present disclosure.

Referring now to FIG. 3, a schematic block diagram of the access control device 104 used in the system 100 in accordance with an exemplary embodiment of the present disclosure is shown. The access control device 104 includes an NFC receiver 302, a first Bluetooth or UWB receiver 304, a first ZigBee, Wi-Fi, Satellite, UWB, or Ethernet transceiver 306, a second control unit 308, and a first memory 310. In an exemplary embodiment, the access control device 104 supports NFC, Bluetooth, UWB, ZigBee, Wi-Fi, Satellite, and Ethernet protocols. The access control device 104 receives the NFC and Bluetooth or UWB signals that include the credential and the ID number or certificate of the individual by way of the NFC receiver 302 and the first Bluetooth or UWB receiver 304, respectively. The second control unit 308 retrieves the credential and the ID number or certificate of the individual from the NFC and the Bluetooth or UWB signals, respectively. The access control device 104 also receives the verification data of the plurality of individuals from the gateway device 108 by way of the first ZigBee, Wi-Fi, Satellite, UWB, or Ethernet transceiver 306 and stores the verification data in the first memory 310. The second control unit 308 compares the credential of the individual with the set of credentials included in the verification data. The second control unit 308 generates an access control signal based on the comparison of the credential of the individual with the set of credentials. In an exemplary embodiment, the second control unit 308 generates the access control signal when the credential of the individual matches with at least one credential in the set of credentials. However, the second control unit 308 does not generate the access control signal when the credential of the individual does not match with any credential in the set of credentials. The locking mechanism 112 is connected (i.e., communicatively coupled) to the access control device 104 for receiving the access control signal. The locking mechanism 112 provides access of the restricted area to the individual when the locking mechanism 112 receives the access control signal. The communication between the locking mechanism 112 and the access control device 104 is at least one of wired and wireless communication. The locking mechanism 112 includes at least one of an electromagnetic lock, an electric strike, an electric bolt lock, and the like. In the preferred embodiment, the locking mechanism 112 is the electromagnetic lock. Further, the access control device 104 determines the location of the individual based on the received signal strength indicator (RSSI) of the Bluetooth signal. It is well known to a person skilled in the art that the RSSI is a measurement of power in a radio signal that is received at the gateway receiver. Further, the RSSI of the Bluetooth signal is indicative of a distance of the source of the Bluetooth signal from the access control device 104. In case of the UWB signal, the access control device 104 determines the location of the individual based on Time Difference of Arrival (TDoA) or Time of Arrival (ToA) of the beacon (i.e., UWB signal) along with its RSSI. In the presently preferred embodiment, the source of the Bluetooth or UWB signal is the access card 102. The second control unit 308 compares the ID number or certificate of the individual with the set of ID numbers or certificates included in the verification data. The access control device 104 determines the location of the individual if the ID number or certificate of the individual matches with at least one ID number or certificate in the set of ID numbers or certificates. The access control device 104 further tracks the location of the individual within a first coverage distance. The coverage distance is a maximum distance from which the access control device 104 can receive the Bluetooth or UWB signal broadcasted by the access card 102. In case of the Bluetooth signal, the first coverage distance is 75-100 meters. In case of the UWB signal, the first coverage distance is 15-250 meters with an accuracy of 1 decameter to 2 meters.

Figure 4:
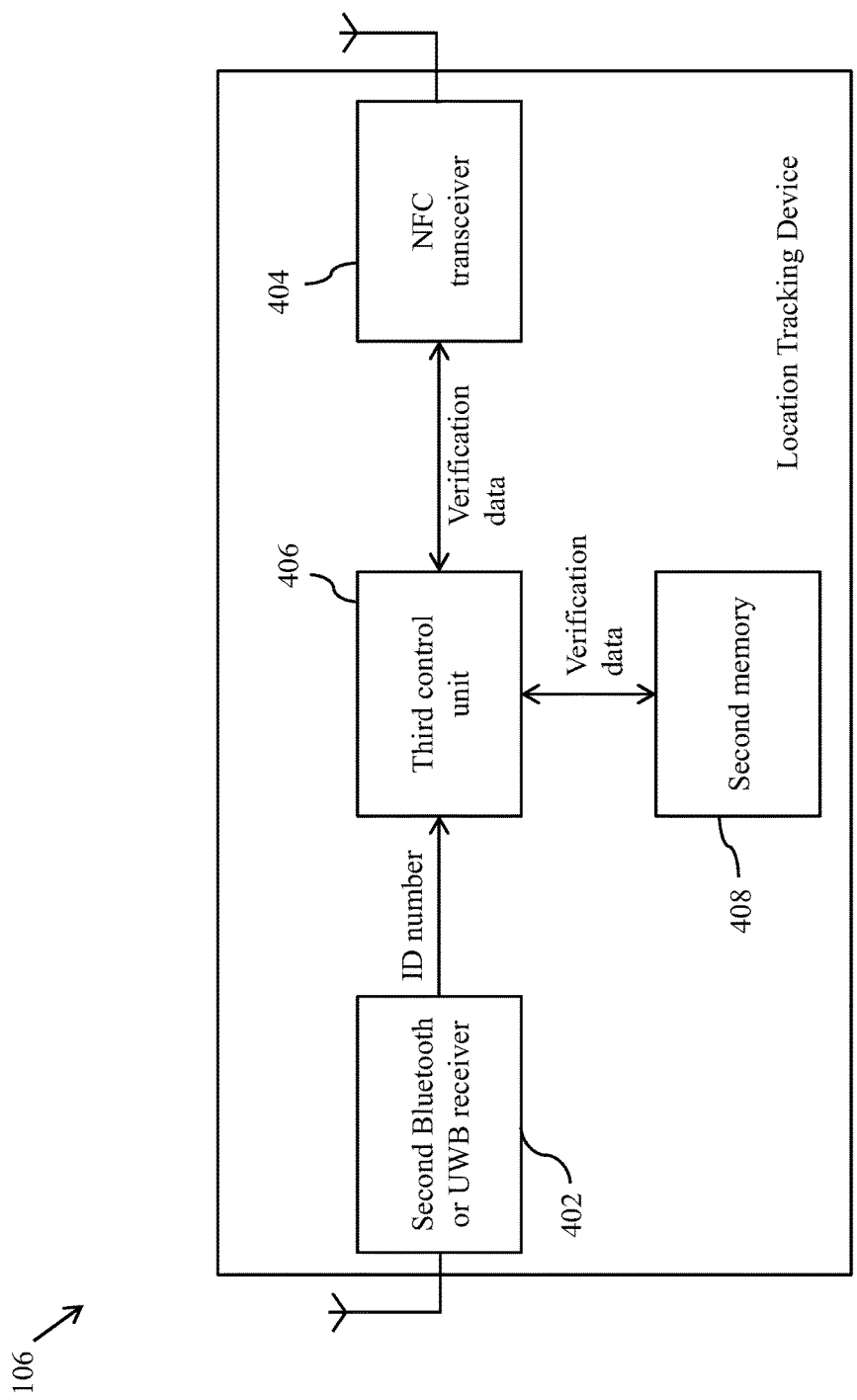
FIG. 4 illustrates a schematic block diagram of a location tracking device used in the access control and location tracking system of FIG. 1, in accordance with an exemplary embodiment of the present disclosure.

Referring now to FIG. 4, a schematic block diagram of the location tracking device 106 used in the system 100 in accordance with an exemplary embodiment of the present disclosure is shown. The location tracking device 106 includes a second Bluetooth or UWB receiver 402, an NFC transceiver 404, a third control unit 406, and a second memory 408. The location tracking device 106 supports Bluetooth, UWB, NFC, Wi-Fi, Satellite, or Ethernet communication protocols. The location tracking device 106 receives the verification data from the gateway device 108 by way of the second Bluetooth or UWB receiver 402 or the NFC transceiver 404. The location tracking device 106 stores the verification data in the second memory 408. The location tracking device 106 receives the Bluetooth or UWB signal by way of the second Bluetooth or UWB receiver 402. The third control unit 406 compares the ID number or certificate included in the Bluetooth or UWB signal with the ID numbers or certificates included in the verification data. The location tracking device 106 determines the location of the individual when the ID number or certificate included in the Bluetooth or UWB signal matches with at least one ID number or certificate included in the verification data. The location tracking device 106 determines the location of the individual based on the RSSI of the Bluetooth signal. In case of the UWB signal, the location tracking device 106 determines the location of the individual based on the TDoA or ToA of the beacon along with its RSSI. The location tracking device 106 further tracks the location of the individual within a second coverage distance. In an exemplary embodiment, the second coverage di stance is 35-40 meters.

Figure 5:
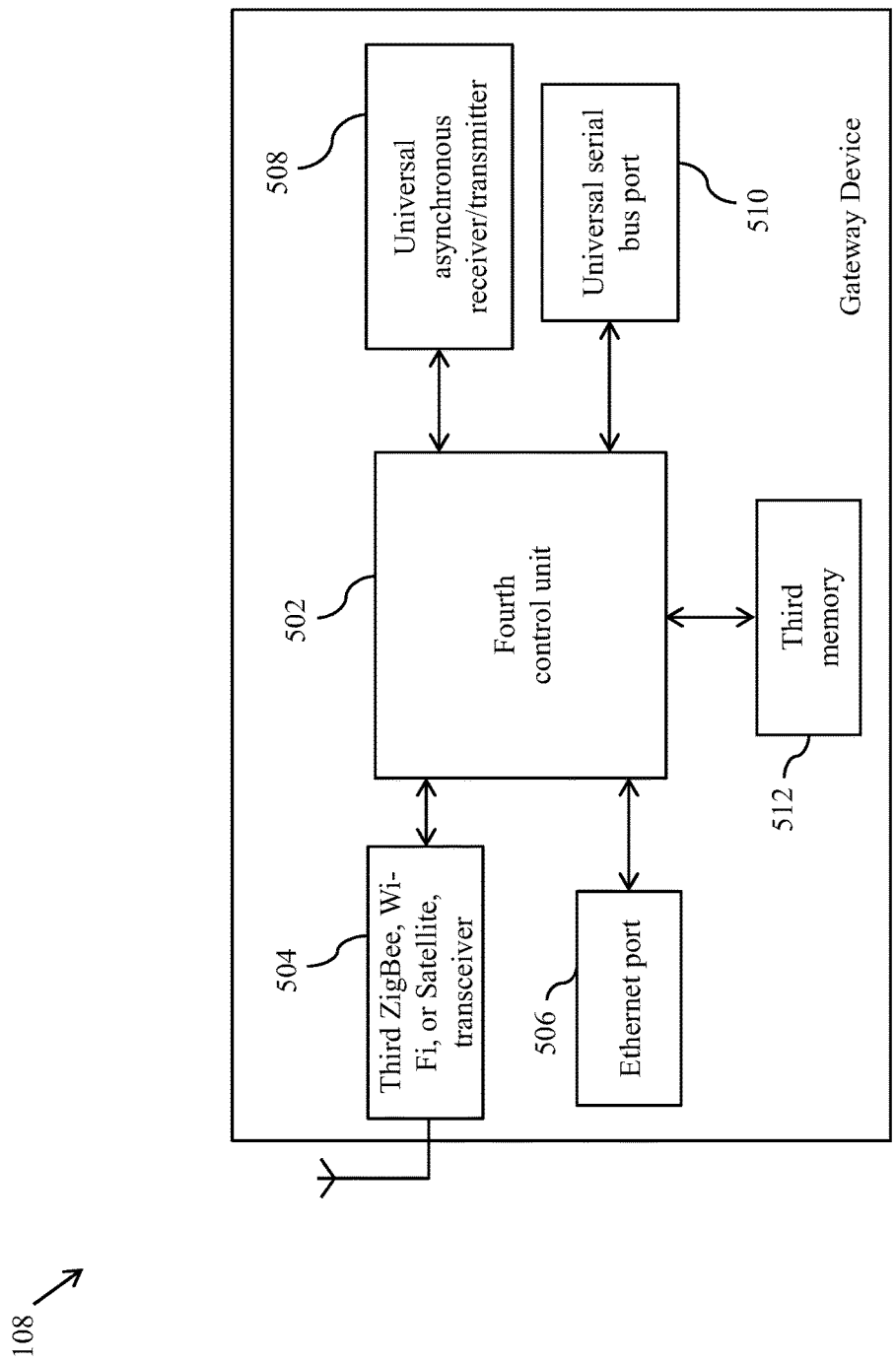
FIG. 5 illustrates a schematic block diagram of a gateway device used in the access control and location tracking system of FIG. 1, in accordance with an exemplary embodiment of the present disclosure.

Referring now to FIG. 5, a schematic block diagram of the gateway device 108 used in the system 100 in accordance with an exemplary embodiment of the present disclosure is shown. The gateway device 108 may be a standalone device or may be integrated or built into the access control device 104. The gateway device 108 includes a fourth control unit 502, a third ZigBee, Wi-Fi, or Satellite transceiver 504, an Ethernet port 506, a universal asynchronous receiver/transmitter (UART) 508, a universal serial bus port (USB) 510, and a third memory 512. The gateway device 108 is connected (i.e., communicatively coupled) to the server 110 by at least one of the UART 508 and the USB port 510. The gateway device 108 receives the verification data from the server 110. The gateway device 108 stores the verification data in the third memory 512. The gateway device 108 transmits the verification data to the access control device 104 and the location tracking device 106 by way of the third ZigBee, Wi-Fi, or Satellite transceiver 504. The gateway device 108 along with the access control device 104 and the location tracking device 106 form a personal area network (PAN). The types of the gateway device 108 include a low-end gateway device and a power-packed gateway device. The low-end gateway device is capable of supporting 100 devices and the power-packed gateway device is capable of supporting 35000 devices.

Figure 6:
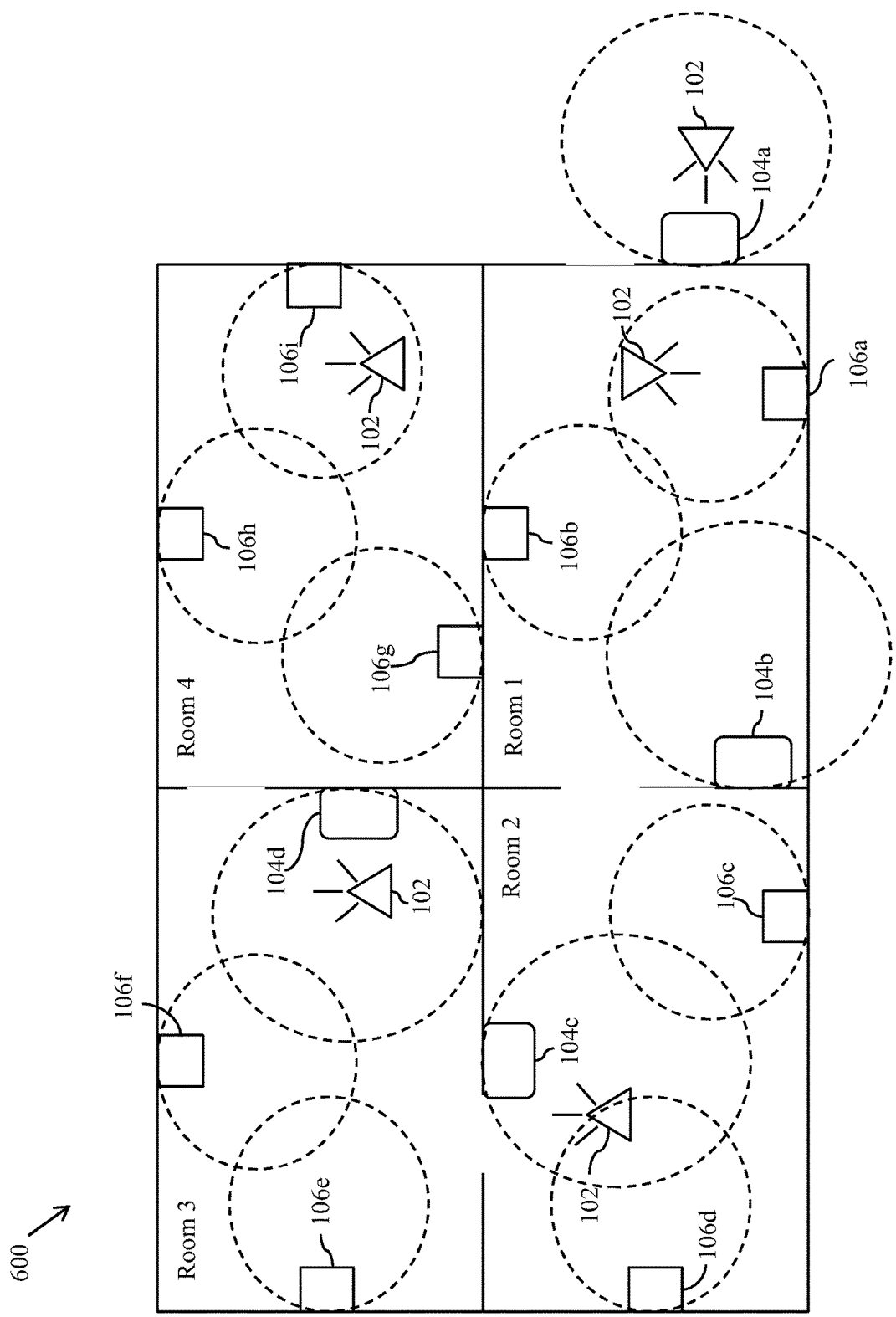
FIG. 6 illustrates a layout of a restricted area, where the access control and location tracking system of FIG. 1 is implemented, in accordance with an exemplary embodiment of the present disclosure.

Referring now to FIG. 6, a layout of the restricted area where the system 100 is implemented in accordance with an exemplary embodiment of the present disclosure is shown. The system 100 provides access of the restricted area to the individual carrying the access card 102. The system 100 also tracks multiple locations of the individual within the restricted area. The restricted area includes first through fourth rooms. First through fourth doors corresponding to the first through fourth rooms are illustrated by discontinuities in walls. First through fourth access control devices 104a-104d (together referred to as the access control device 104) and first through ninth location tracking devices 106a-106i (together referred to as the location tracking device 106) are deployed in the restricted area to provide the access and track the location of the individual carrying the access card 102. The access control device 104 and the location tracking device 106 communicate with the gateway device 108 (not shown). Further, the gateway device 108 communicates with the server 110 (not shown). The first through fourth access control devices 104a-104d are connected (i.e., communicatively coupled) to first through fourth locking mechanisms 112a-112d (not shown), respectively. The first through fourth locking mechanisms 112a-112d are coupled to the first through fourth doors to control the access of the first through fourth rooms, respectively. Moreover, there is no limitation to the number of access cards 102, the gateway devices 108, the access control devices 104, and the location tracking devices 106 that may be deployed in the layout.

The first through fourth access control devices 104a-104d are installed at the first through fourth doors, respectively. When the individual, carrying the access card 102, approaches near the first access control device 104a, the access card 102 transmits the credential of the individual to the first access control device 104a by way of the NFC signal. The first access control device 104a compares the credential of the individual with the verification data, more specifically with the set of credentials included in the verification data. When the credential of the individual matches with at least one credential in the set of credentials, the first access control device 104a generates a first access control signal. The first access control signal unlocks the first locking mechanism, coupled to the first door, and provides access of the first room to the individual. Similarly, the second through fourth access control devices 104b-104d provide access of the second through fourth rooms, respectively, to the individual.

Further, the first access control device 104a receives the Bluetooth or UWB signal broadcasted by the access card 102 when the access card 102 is within the first coverage distance. The first access control device 104a determines a first location of the individual based on the Bluetooth or UWB signal and the ID number or certificate of the individual. The access control device 104a generates first location data corresponding to the first location of the individual. The first location data is indicative of the proximity of the access card 102 to the first access control device 104a. The first location data is generated when the access card 102 is within the first coverage distance of the first access control device 104a. Thus, the first access control device 104a tracks the location of the individual. The first location data is transmitted to the gateway device 108 by the first access control device 104a. Similarly, the second through fourth access control devices 104b-104d generate second through fourth location data of the individual, respectively, and transmit the second through fourth location data to the gateway device 108.

Furthermore, the first and second location tracking devices 106a and 106b are installed in the first room to track the location of the individual within the first room. The third and fourth location tracking devices 106c and 106d are installed in the second room to track the location of the individual within the second room. The fifth and sixth location tracking devices 106e and 106f are installed in the third room to track the location of the individual within the third room. The seventh through ninth location tracking devices 106g and 106i are installed in the fourth room to track the location of the individual within the fourth room. The first location tracking device 106a receives the Bluetooth or UWB signal from the access card 102 when the access card 102 is within the second coverage distance of the first location tracking device 106a. The first location tracking device 106a determines a fifth location of the individual based on the Bluetooth or UWB signal and the ID number or certificate of the individual. Further, the first location tracking device 106a generates fifth location data corresponding to the fifth location of the individual. The fifth location data is indicative of the proximity of the access card 102 to the first location tracking device 106a. The fifth location data is generated when the access card 102 is within the second coverage distance of the first location tracking device 106a. The fifth location data is transmitted to the gateway device 108 by the first location tracking device 106a. Similarly, the second through ninth location tracking devices 106b-106i generate sixth through thirteenth location data of the individual, respectively, and transmit the sixth through thirteenth location data to the gateway device 108.

The gateway device 108 transmits the first through thirteenth location data to the server 110. The software code processes the first through thirteenth location data to generate location information of the individual. Further, the software code integrates the location information with the 3D representation of the restricted area to generate a visual model that provides real-time location data of the individual in the restricted area. Moreover, the server 110 provides a functionality of tracking the time spent by the individual in a particular room in the restricted area based on the first clock signal. The server 110 further integrates information corresponding to the time spent by the individual in the particular room in the real-time location data. Furthermore, the server 110 receives a battery status of the access control device 104, the location tracking device 106, and the access card 102 from the gateway device 108.

Figure 7:
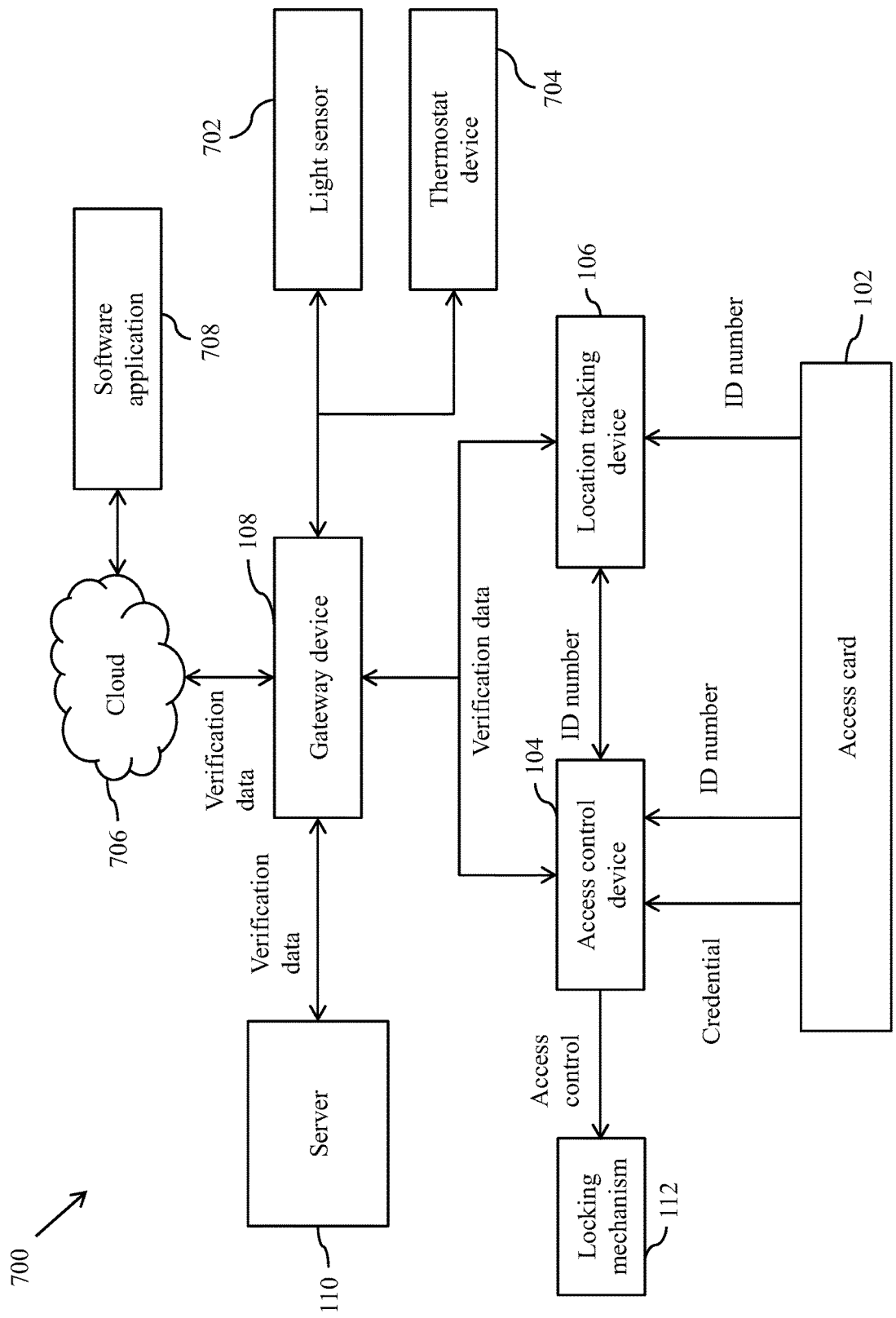
FIG. 7 illustrates a schematic block diagram of the access control and location tracking system, in accordance with another exemplary embodiment of the present disclosure.

Referring now to FIG. 7, a schematic block diagram of an alternate embodiment of the system 100 in accordance with an exemplary embodiment of the present disclosure is shown. The system 100 is implemented in a private residence of the individual. The gateway device 108 is connected (i.e., communicatively coupled) to a light sensor 702, a thermostat device 704, and an air quality sensor (not shown). Further, the gateway device 108 is connected (i.e., communicatively coupled) to a cloud server 706. The gateway device 108 along with the light sensor 702, the thermostat device 704, and the air quality sensor form the personal area network (PAN). The communication within the PAN is carried out using at least one of ZigBee, Z-Wave, 6LowPAN, Wi-Fi, Sigfox, Neul, Satellite, Ethernet, NFC protocols, and the like. The gateway device 108 receives operational data from the light sensor 702, the thermostat device 704, and the air quality sensor. The gateway device 108 uploads the operational data to the cloud server 706. The operational data includes health of the devices included in the PAN, presence of the individual near the devices deployed in the PAN, and the like. The operational data stored in the cloud server 706 may be downloaded onto a software application 708. The software application 708 may be installed and operable to run on at least one of a mobile device, a tablet, or a personal computer of the individual.

In yet another embodiment, the Bluetooth or UWB signal, transmitted by the access card 102, is used to provide access to the individual into the restricted area. Thus, the access control device 104 may be configured to provide handsfree access to the individual when the access card 102 is within an access range of the access control device 104. The access range is a maximum distance at which the access card 102 is located to enable the access control device 104 for providing access of the restricted area to the individual. The access range may be less than the first and second coverage distance.

In yet another embodiment, the gateway device 108 is connected (i.e., communicatively coupled) to the cloud server 706. The gateway device 108 uploads the credential and the ID number or certificate, and the first through thirteenth location data into the cloud server 706. Further, the cloud server 706 also stores the verification data of all the individuals who are authorized to access the restricted area. The access control device 104 fetches the verification data from the cloud server 706 by way of the gateway device 108 when the verification data stored in the access control device 104 is corrupt or lost. The gateway device 108 uses Message Queuing Telemetry Transport (MQTT) protocol to connect and communicate with the cloud server 706. The cloud server 706 includes a cloud computing system. The cloud computing system maintains, manages, and updates the verification data.

In yet another embodiment, the access card 102 includes a biometric data input interface and a fourth memory. The fourth memory stores biometric verification data of the individual. The individual provides first biometric data by way of the biometric data input interface to the access card 102. The first biometric data is compared with the biometric verification data stored in the fourth memory by the first control unit 206. When the first biometric data matches with the biometric verification data, the access card 102 transmits the credential and the ID number or certificate of the individual to the access control device 104 by way of the NFC signal and the Bluetooth or UWB signal, respectively.

In yet another embodiment, the system 100 relates to a visitor management system in the restricted area. Each of the access control device 104 and the location tracking device 106 includes a display unit and the map of the restricted area. A visitor intending to visit the restricted area and meet the individual is provided a visitor access card. The visitor access card is structurally and functionally similar to the access card 102. The visitor access card includes a visitor credential, the visitor ID number, and destination information. The destination information includes the details corresponding to at least one of location information of the individual within the restricted area, meeting availability information of the individual, and office location of the individual within the restricted area. When the visitor along with the visitor access card is within the first coverage distance of the access control device 104, the destination information is transmitted to the access control device 104. The access control device 104 processes the destination information and provides assistance information to the individual. The assistance information includes at least one of direction information, route information, meeting time information, and availability information. In another embodiment, each of the access control device 104 and the location tracking device 106 includes a speaker (not shown). The speaker delivers audio messages to the visitor. The audio messages include at least one of direction information, route information, welcome note, and availability information.

In yet another embodiment, the access control device 104 includes an access camera (not shown). The access camera provides an identification check of the individual entering the restricted area. The server 110 stores image verification data and the verification data. When the individual with the access card 102 is within the assess range of the access control device 104, the access camera captures an image of the individual. Simultaneously, the access control device 104 receives the credential and the ID number or certificate of the individual from the access card 102. The access control device 104 transmits the image and the credential of the individual to the server 110 by way of the gateway device 108. The server 110 includes an image processing software code, which compares the image and the credential of the individual with the image verification data and the verification data, respectively. When the image and the credential of the individual matches with the image verification data and the verification data, respectively, the access control device 104 provides access of the restricted area to the individual. Further, the access camera enables an alarm system to indicate presence of an unauthorized individual entering in the restricted area when the image of the individual does not match with at least one image in the image verification data.

In yet another embodiment, the system 100 relates to an inventory management system in the restricted area. An inventory includes assets such as medical equipment, vehicles, jewelry, and the like. Each asset includes a corresponding Bluetooth or UWB transmitter 202. Each Bluetooth or UWB transmitter 202 transmits a Bluetooth or UWB signal. The access control device 104 and the location tracking device 106 receive the Bluetooth or UWB signal from the corresponding assets and track locations of the corresponding asset within the restricted area.

The system 100 provides the access of the restricted area to the individual and tracks multiple locations of the individual, simultaneously. The system 100 generates a real time 3D representation of the restricted area with historic and current location of the individual roaming in the restricted area. The gateway device 108 uses low power communication protocols to track the multiple locations of the multiple individuals efficiently and effectively. The access card 102 generates the NFC and the Bluetooth or UWB signal by the way of non-conventional sources of energy such as solar energy, kinetic energy from the movements of the individual, and the electromagnetic (EM) energy from radio frequency (RF) waves that are available to the access card 102. The system 100 provides access and tracks the location of the individual without real time monitoring by an administrator. The system 100 is easy to deploy and avoids the implementation of complex algorithms in determining the locations of the individuals in the restricted area.

In yet another embodiment, the individual uses a smartphone to communicate with the access control device 104 and the location tracking device 106. The smartphone includes a software application that stores user data. The smartphone receives the user data when the individual installs and uses the software application for the first time. The smartphone includes multiple input devices to receive the user data. Examples of input devices include a touch screen, a fingerprint sensor, a microphone, a camera, and the like. The user data includes at least one of the biometric data, mobile number of the individual, password set by the individual, face recognition data, voice recognition data, and the like. The individual logs into the software application by inputting input data, wherein the input data includes at least one of the biometric data, mobile number of the individual, password set by the individual, face recognition data, and voice recognition data. The smartphone compares the input data with the user data. When the input data matches with the user data, the smartphone, allows the individual to input the credentials and the ID number of the individual in the software application. The credentials and the ID number of the individual are stored in the server. Subsequently, the smartphone is configured to provide the access of the restricted area to the individual when the software application stores the credential and the ID number or certificate of the individual.

In one example, when the individual with the smartphone is in the proximity of the access control device 104, the software application generates a pop-up message and/or a prompt request on its display to provide the input data. When the individual provides the input data requested by the software application, the smartphone compares the input data with the user data. When the input data matches with the user data, the smartphone allows the software application to send the credential and the ID number or certificate of the individual to the access control device 104 by way of the Bluetooth or UWB communication protocol. The access control device 104 verifies the credential and the ID number or certificate of the individual. Subsequently, the access control device 104 authenticates the individual by comparing the credential and the ID number or certificate of the individual with the verification data and outputs access control signal to the locking mechanism 112. The locking mechanism 112 unlocks the door of the restricted area, thereby allowing entry to the individual. The restricted area is at least one of a theatre, an airport, a railway station, and other high security areas.

The present disclosure has been described herein with reference to a particular embodiment for a particular application. Although selected embodiments have been illustrated and described in detail, it may be understood that various substitutions and alterations are possible. Those having ordinary skill in the art and access to the present teachings may recognize additional various substitutions and alterations are also possible without departing from the spirit and scope of the present disclosure, and as defined by the following claim.

What is claimed is:

1. A system for providing physical access of a restricted area to an individual, wherein the system tracks a plurality of locations of the individual, the system comprising:
    a server configured to store and output verification data, wherein the verification data includes a plurality of credentials and a plurality of identification (ID) numbers or a plurality of certificates corresponding to a plurality of individuals;
    a gateway device configured to receive the verification data from the server;
    an access card configured to output a near field communication (NFC) signal and a Bluetooth or Ultra-wideband (UWB) signal, wherein the NFC signal includes a credential of the individual, and wherein the Bluetooth or UWB signal includes an ID number or a certificate of the individual;
    an access control device, connected to the gateway device, wherein the access control device is configured to:
        receive the verification data from the gateway device;
        receive the NFC signal and the Bluetooth or UWB signal from the access card;
        compare the credential and the ID number or certificate of the individual with the verification data, wherein the access control device extracts the credential and the ID number or certificate from the NFC signal and the Bluetooth or UWB signal, respectively;
        generate an access control signal based on the comparison between the credential of the individual and the verification data;
        provide the access control signal to a locking mechanism, wherein the locking mechanism facilitates access of the restricted area to the individual based on the access control signal; and
        determine a first location of the individual based on the Bluetooth or UWB signal, and the comparison between the ID number or certificate of the individual and the verification data; and
    a location tracking device, connected to the gateway device, wherein the location tracking device is configured to:
        receive the verification data from the gateway device;
        receive the Bluetooth or UWB signal from the access card;
        compare the ID number or certificate of the individual with the verification data, wherein the location tracking device extracts the ID number or certificate from the Bluetooth or UWB signal; and
        determine a second location of the individual based on the Bluetooth or UWB signal and the comparison between the ID number or certificate and the verification data.

2. The system of claim 1, wherein the server is further configured to:
    receive first and second location data by way of the gateway, wherein the access control device generates the first location data corresponding to the first location of the individual, and wherein the location tracking device generates the second location data corresponding to the second location of the individual; and
    generate a visual model based on the first and second location data.

3. The system of claim 1, wherein the access card further comprises:
    an NFC transmitter configured to transmit the NFC signal to the access control device when the access card is within a first coverage distance of the access control device; and
    a Bluetooth or UWB transmitter configured to transmit the Bluetooth or UWB signal to the access control device and the location tracking device, wherein the Bluetooth signal is a Bluetooth low energy signal, and wherein the UWB signal is a signal in a range from 3.1 to 10.6 GHz.

4. The system of claim 1, wherein the access control device further comprises:
    an NFC receiver configured to wirelessly connect with the access card for receiving the NFC signal;
    a Bluetooth or UWB receiver configured to wirelessly connect with the access card for receiving the Bluetooth or UWB signal;
    a ZigBee, Wi-Fi, Satellite, or Ethernet transceiver configured to wirelessly connect with the gateway device for receiving the verification data, wherein the ZigBee, Wi-Fi, Satellite, or Ethernet transceiver communicates using ZigBee, Wi-Fi, Satellite, or Ethernet protocol, respectively;
    a memory configured to store the verification data; and
    a control unit that is connected to the NFC receiver, the Bluetooth or UWB receiver, the ZigBee, Wi-Fi, Satellite, or Ethernet transceiver, and the memory, wherein the control unit is configured to:
        receive the NFC signal from the NFC receiver;

receive the Bluetooth or UWB signal from the Bluetooth or UWB receiver;

determine the first location based on the Bluetooth or UWB signal, wherein the first location is determined based on received signal strength indicator (RSSI) of the Bluetooth signal, or wherein the first location is determined based on Time Difference of Arrival (TDoA) or Time of Arrival (ToA) of the UWB signal along with its RSSI;

compare the credential and the ID number or the certificate of the individual with the verification data; and output the access control signal based on the comparison of the credential of the individual and the verification data.

5. The system of claim 1, wherein the location tracking device further comprises:

a Bluetooth or UWB receiver configured to wirelessly connect with the access card for receiving the Bluetooth or UWB signal;

an NFC transceiver connected to the gateway device for receiving the verification data;

a memory configured to store the verification data; and a control unit that is connected to the Bluetooth or UWB receiver, the NFC transceiver, and the memory, wherein the control unit is configured to:

receive the Bluetooth or UWB signal from the Bluetooth or UWB receiver;

compare the ID number or the certificate of the individual with the verification data; and determine the second location of the individual based on the Bluetooth or UWB signal and the comparison of the ID number or the certificate and the verification data, wherein the control unit determines the second location of the individual based on received signal strength indicator (RSSI) of the Bluetooth signal or based on Time Difference of Arrival (TDoA) or Time of Arrival (ToA) of the UWB signal along with its RSSI.

6. A method for providing physical access of a restricted area to an individual by a system, wherein the system tracks a plurality of locations of the individual, the method comprising:

receiving verification data from a gateway device by an access control device, wherein the gateway device receives the verification data from a server, and wherein the verification data includes a plurality of credentials and a plurality of identification (ID) numbers or a plurality of certificates corresponding to a plurality of individuals;

receiving a near field communication (NFC) signal and a Bluetooth or Ultra-wideband (UWB) signal by the access control device, wherein the NFC signal and the Bluetooth or UWB signal includes a credential and an ID number or a certificate of the individual, respectively, and wherein the NFC signal and the Bluetooth or UWB signal is transmitted by an access card;

comparing the credential and the ID number or certificate of the individual with the verification data by the access control device;

generating an access control signal based on the comparison between the credential of the individual and the verification data;

providing the access control signal to a locking mechanism by the access control device, wherein the locking mechanism facilitates access of the restricted area to the individual based on the access control signal;

determining a first location of the individual based on the Bluetooth or UWB signal and the comparison between the ID number or certificate of the individual and the verification data by the access control device;

receiving the verification data from the gateway device by a location tracking device;

receiving the Bluetooth or UWB signal from the access card by the location tracking device;

comparing the ID number or certificate of the individual with the verification data by the location tracking device; and determining a second location of the individual based on the Bluetooth or UWB signal and the comparison between the ID number or certificate and the verification data.

7. The method of claim 6, further comprising:

receiving, by the server, first and second location data from the access control device and the location tracking device, respectively, wherein the access control device generates the first location data corresponding to the first location of the individual, and wherein the location tracking device generates the second location data corresponding to the second location of the individual; and generating, by the server, a visual model based on the first and second location data.

8. The method of claim 6, further comprising:

transmitting, by an NFC transmitter of the access card, the NFC signal to the access control device when the access card is within a first coverage distance of the access control device; and transmitting, by a Bluetooth or UWB transmitter of the access card, the Bluetooth or UWB signal to the access control device and the location tracking device, wherein the Bluetooth signal is a Bluetooth low energy signal, and wherein the UWB signal is a signal in a range from 3.1 to 10.6 GHz.

9. The method of claim 6, further comprising:

receiving, by an NFC receiver of the access control device, the NFC signal from the access card, wherein the NFC receiver is configured to wirelessly connect with the access card;

receiving, by a Bluetooth or UWB receiver of the access control device, the Bluetooth or UWB signal from the access card, wherein the Bluetooth or UWB receiver is configured to wirelessly connect with the access card;

receiving, by a ZigBee, Wi-Fi, Satellite, or Ethernet transceiver of the access control device, the verification data from the gateway device, wherein the ZigBee, Wi-Fi, Satellite, or Ethernet transceiver is configured to wirelessly connect with the gateway device, and wherein the ZigBee, Wi-Fi, Satellite, or Ethernet transceiver communicates using ZigBee, Wi-Fi, Satellite, or Ethernet protocol, respectively;

storing, by a memory of the access control device, the verification data;

receiving, by a control unit of the access control device, the NFC signal from the NFC receiver;

receiving, by the control unit, the Bluetooth or UWB signal from the Bluetooth or UWB receiver;

determining, by the control unit, the first location based on the Bluetooth or UWB signal;

comparing, by the control unit, the credential and the ID number or certificate of the individual with the verification data; and outputting, by the control unit, the access control signal based on the comparison of the credential of the individual and the verification data,
wherein the control unit that is connected to the NFC receiver, the Bluetooth or UWB receiver, the ZigBee, Wi-Fi, Satellite, or Ethernet transceiver, and the memory.

10. The method of claim 6, wherein further comprising:
receiving, by a Bluetooth or UWB receiver of the location tracking device, the Bluetooth or UWB signal from the access card, wherein the Bluetooth or UWB receiver is configured to wirelessly connect with the access card;
receiving, by an NFC transceiver of the location tracking device, the verification data from the gateway device, wherein the NFC transceiver is connected to the gateway device;
storing, by a memory of the location tracking device, the verification data;
receiving, by a control unit of the location tracking device, the Bluetooth or UWB signal from the Bluetooth or UWB receiver;
comparing, by the control unit, the ID number or certificate of the individual with the verification data; and
determining, by the control unit, the second location of the individual based on the Bluetooth or UWB signal and the comparison of the ID number or certificate and the verification data, wherein the control unit determines the second location of the individual based on received signal strength indicator (RSSI) of the Bluetooth signal or based on Time Difference of Arrival (TDoA) or Time of Arrival (ToA) of the UWB signal along with its RSSI, and wherein the control unit is connected to the Bluetooth or UWB receiver, the NFC transceiver, and the memory.

11. A system for providing physical access of a restricted area to an individual and tracking a plurality of locations of the individual, the system comprising:
a gateway device configured to receive verification data from a server;
an access card configured to output a near field communication (NFC) signal and a Bluetooth or Ultra-wideband (UWB) signal, wherein the NFC signal includes a credential of the individual, and wherein the Bluetooth or UWB signal includes an ID number or a certificate of the individual; and
an access control device that is connected to the gateway device, wherein the access control device is configured to:
receive the verification data from the gateway device;
receive the NFC signal and the Bluetooth or UWB signal from the access card;
compare the credential and the ID number or certificate of the individual with the verification data;
generate an access control signal based on the comparison between the credential of the individual and the verification data; and
provide the access control signal to a locking mechanism, wherein the locking mechanism facilitates access of the restricted area to the individual based on the access control signal.

12. The system of claim 11, wherein the access control device is further configured to determine a first location of the individual based on the Bluetooth or UWB signal, and the comparison between the ID number or certificate of the individual and the verification data.

13. The system of claim 12, further comprising a location tracking device that is connected to the gateway device, wherein the location tracking device is configured to:
receive the verification data from the gateway device;
receive the Bluetooth or UWB signal from the access card;
compare the ID number or certificate of the individual with the verification data; and
determine a second location of the individual based on the Bluetooth or UWB signal, and the comparison between the ID number or certificate and the verification data, wherein the location tracking device extracts the ID number or certificate from the Bluetooth or UWB signal.

14. The system of claim 13, wherein the server is further configured to:
receive first and second location data by way of the gateway, wherein the access control device generates the first location data corresponding to the first location of the individual, and wherein the location tracking device generates the second location data corresponding to the second location of the individual; and
generate a visual model based on the first and second location data.

15. The system of claim 11, wherein the access card further comprises:
an NFC transmitter configured to transmit the NFC signal to the access control device when the access card is within a first coverage distance of the access control device; and
a Bluetooth or UWB transmitter configured to transmit the Bluetooth or UWB signal to the access control device and the location tracking device, wherein the Bluetooth signal is a Bluetooth low energy signal, and wherein the UWB signal is a signal in a range from 3.1 to 10.6 GHz.

16. The system of claim 11, wherein the access control device further comprises:
an NFC receiver configured to wirelessly connect with the access card for receiving the NFC signal;
a Bluetooth or UWB receiver configured to wirelessly connect with the access card for receiving the Bluetooth or UWB signal;
a ZigBee, Wi-Fi, Satellite, or Ethernet transceiver configured to wirelessly connect with the gateway device for receiving the verification data, wherein the ZigBee, Wi-Fi, Satellite, or Ethernet transceiver communicates using ZigBee, Wi-Fi, Satellite, or Ethernet protocol, respectively;
a memory configured to store the verification data; and
a control unit that is connected to the NFC receiver, the Bluetooth or UWB receiver, the ZigBee, Wi-Fi, Satellite, or Ethernet transceiver, and the memory, wherein the control unit is configured to:
receive the NFC signal from the NFC receiver;
receive the Bluetooth or UWB signal from the Bluetooth or UWB receiver;
determine the first location based on the Bluetooth or UWB signal, wherein the first location is determined based on received signal strength indicator (RSSI) of the Bluetooth signal, or wherein the first location is determined based on Time Difference of Arrival (TDoA) or Time of Arrival (ToA) of the UWB signal along with its RSSI;
compare the credential and the ID number or the certificate of the individual with the verification data; and output the access control signal based on the comparison of the credential of the individual and the verification data.

17. The system of claim 11, wherein the location tracking device further comprises:
  a Bluetooth or UWB receiver configured to wirelessly connect with the access card for receiving the Bluetooth or UWB signal;
  an NFC transceiver connected to the gateway device for receiving the verification data;
  a memory configured to store the verification data; and
  a control unit that is connected to the Bluetooth or UWB receiver, the NFC transceiver, and the memory, wherein the control unit is configured to:
    receive the Bluetooth or UWB signal from the Bluetooth or UWB receiver;
    compare the ID number or the certificate of the individual with the verification data; and
    determine the second location of the individual based on the Bluetooth or UWB signal and the comparison of the ID number or the certificate and the verification data, wherein the control unit determines the second location of the individual based on received signal strength indicator (RSSI) of the Bluetooth signal or based on Time Difference of Arrival (TDoA) or Time of Arrival (ToA) of the UWB signal along with its RSSI.

18. The system of claim 11, wherein the verification data includes a plurality of credentials and a plurality of identification (ID) numbers or a plurality of certificates corresponding to a plurality of individuals.

19. The system of claim 11, wherein the access control device is further configured to extract the credential and the ID number or certificate from the NFC signal and the Bluetooth or UWB signal, respectively.

20. The system of claim 11, wherein the server is further configured to store and output the verification data.

* * * * *